Figure 1:
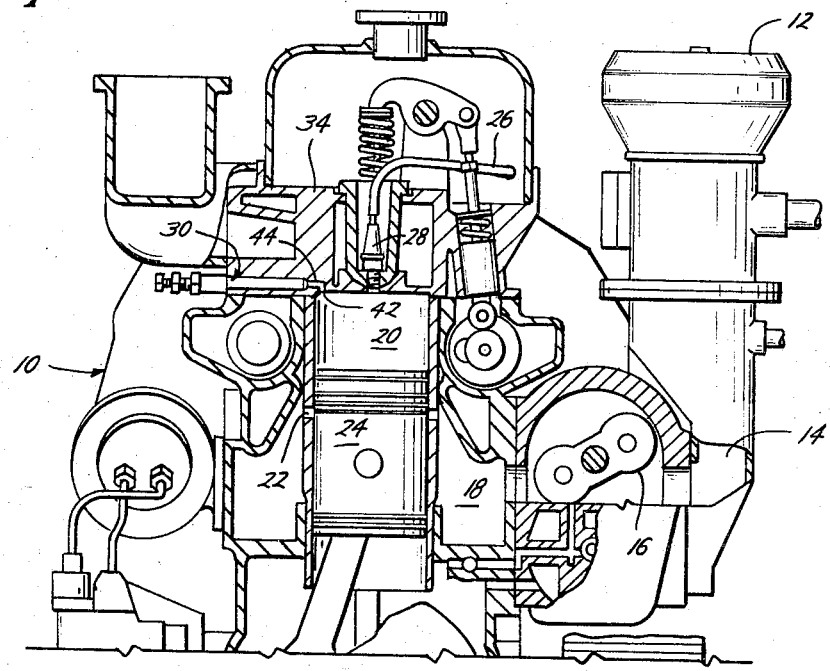

March 5, 1968  R. W. MITCHELL  3,371,525
CYLINDER FIRING PRESSURE APPARATUS
Filed Feb. 4, 1966  2 Sheets-Sheet 1

Robert W. Mitchell
INVENTOR.

BY
ATTORNEYS

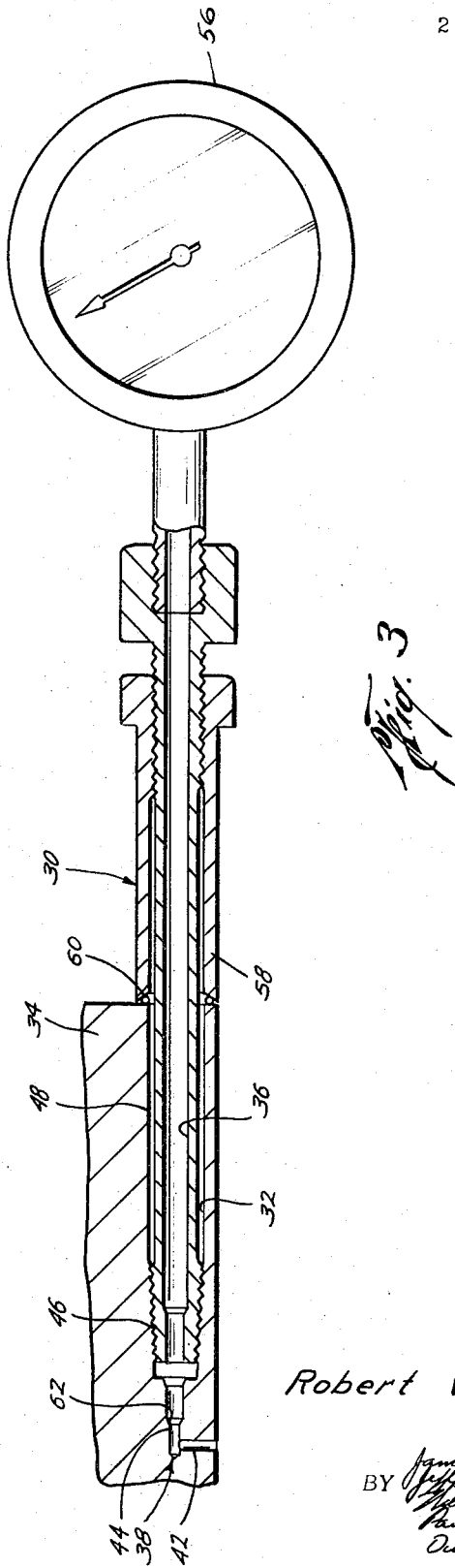

United States Patent Office 3,371,525
Patented Mar. 5, 1968

3,371,525
CYLINDER FIRING PRESSURE APPARATUS
Robert W. Mitchell, Houston, Tex., assignor to Stewart & Stevenson Services, Inc., Houston, Tex., a corporation of Texas
Filed Feb. 4, 1966, Ser. No. 525,225
5 Claims. (Cl. 73—115)

The present invention relates to a cylinder firing pressure apparatus, and more particularly, relates to an apparatus adapted to measure the cylinder firing pressure of an engine, but which does not interfere with the volume of the cylinder when firing pressure tests are completed.

The use of a firing pressure meter of course, is not new, but generally it is used on motors having large capacity combustion chambers. In the use of any large engines the use of a firing pressure assembly does not present any problem as the volume of the space of the firing pressure adapter apparatus in comparison with the volume of the combustion chamber is small. However, in a smaller size engine the volume of the pressure measuring passageways of the cylinder firing pressure apparatus that are placed in communication with the cylinder combustion chamber may be appreciable so as to affect the compression ratio of the engine.

Therefore, it is a general object of the present invention to provide a cylinder firing pressure apparatus for use with an engine wherein the volume of the measuring passageways are reduced when not actually measuring firing pressure so as not to adversely affect the operation of the engine.

A further object of the present invention is the provision of a cylinder firing pressure apparatus by providing a passageway in the engine head in communication with the engine cylinder and providing an adapter body secured to the passageway and adapted to receive a pressure guage for measuring the firing pressure in the cylinder, the adapter body including an opening in communication with the passageway and cylinder, and providing a stem adapted to be secured in the body opening and reducing the volume of the opening when firing tests are not being actually performed.

Still a further object of the present invention is the provision of a cylinder firing pressure apparatus by providing a passageway in the engine head in communication with the engine cylinder and providing an adapter body secured to each passageway and adapted to receive a pressure gauge for measuring pressure in the cylinders, each adapter body including an opening in communication with a passageway and cylinder, and providing a stem adapted to be inserted in a body opening and seating on a seat thereby reducing the volume of the passageway and opening when pressure tests are not being actually performed.

A still further object of the present invention is the provision of a cylinder firing pressure apparatus for use with a diesel engine by providing a vertical passageway in the engine head in communication with the cylinder, a horizontal passageway in the cylinder head connection to the vertical passageway and extending through one side of the engine head, an elongate tubular adapter body the first end of which is threadably secured in the horizontal passageway with the body having an opening in communication with the passageways and the cylinder and having connecting means at the second end of the body for receiving a pressure gauge when making firing pressure tests and providing a stem adapted to be connected to the body when tests are not being made, the stem extending through the opening into the horizontal passageway for reducing the volume of the opening and the horizontal passageway in communication with the cylinder so as to reduce the volume of the chambers in communication with the cylinder.

Still a further object of the present invention is the provision of a firing cylinder pressure apparatus by providing a passageway in the engine head, an adapter body having an opening in communication with the passageway and the cylinder and having connecting means for receiving a pressure gauge for making firing pressure tests, an O-ring and sealing nut encircling the exterior of the adapter body to seal the O-ring against engine head and a stem adapted to be connected to the body when testing is complete, the stem extending through the opening and the passageway to reduce the volume of the opening and passageway which are in communication with the engine cylinder.

Figure 2:
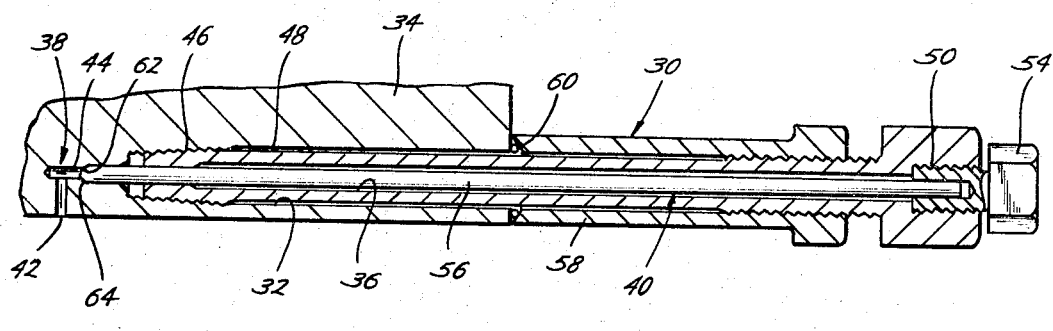

Other and further objects, features and advantages will be apparent from the following description of a presently preferred embodiment of the invention, given for the purpose of disclosure, and taken in conjunction with the accompanying drawings, where FIGURE 1 is an elevational view, in cross-section, illustrating the apparatus of the present invention in position on a diesel engine, FIGURE 2 is an enlarged, fragmentary cross-sectional view of the present invention illustrating its assembly when not in use for measuring the firing pressure, and FIGURE 3 is an enlarged cross-sectional, fragmentary view illustrating the connection of a pressure gauge to the present invention when measuring the cylinder firing pressure.

Referring now to the drawings, and particularly to FIGURE 1, a conventional engine, generally indicated by the reference numeral 10, such as a General Motors diesel engine is shown where air is drawn through air inlets 12 and passes through the blower intake manifold 14, passes through the positive displacement scavenger blower 16 to the air box 18 and thus into one of the cylinders 20 through the inlet port 22. Thus, when the pistons 24 move below and open the port 22, the air from the blower 16 is forced into the cylinder 20. Suitable diesel fuel lines 26 lead to an injector 28 and are provided at the top of each cylinder 20. Thus when air is drawn into the cylinder 20 and highly compressed, the injector will inject the diesel fuel into the cylinder for firing. The above described diesel engine is conventional and no further description is believed to be necessary.

It is desirable at times to measure the cylinder firing pressure. Generally, however, the firing pressure is not measured on engines as small as the General Motors diesel series 71 shown in FIGURE 1. In a smaller size engine the volume of the pressure measuring passageways change, in effect, the volume of the combustion chamber of the cylinder because they are connected thereto.

It is one feature of the present invention to provide a cylinder firing pressure apparatus for use on smaller engines but which when not in use for measuring the firing pressure will not increase the volume of the cylinder combustion chamber. Thus, a cylinder firing pressure assembly, generally indicated by the numeral 30 is shown and generally includes a plurality of elongate tubular bodies 32 which are connected to the engine head 34 and each body includes an opening 36 which is in fluid communication with a passageway 38 in the engine head which is in turn in communication with one of the cylinders 20 or combustion chamber, and a stem 40 for insertion into and filling of the opening 36 and passageway 38 when not measuring the firing pressure.

Of course, it is necessary to have a fluid communication passageway leading to a cylinder 20 or the combustion chamber in order to measure the cylinder firing pressure. However, because of the particular shape of the engine head 34 of the particular engine 10 shown in FIGURE 1, it is necessary for the adapter body 32 to be horizontally inserted in and connected to the side of the engine head 34. Therefore, the passageway 38 preferably includes a vertical portion 42 and a horizontal portion 44. The adapter body 32 is secured to the engine head 34 such as by being threadably connected by threads 46 in a recess 48 in the engine head. The body 32 includes an opening 36 which may be aligned and is in fluid communication with the horizontal passageway 44 and is thus in fluid communication with a cylinder 20.

As best seen in FIGURE 3, the second end of the body 32 has suitable connecting means such as threads 50 for receiving a suitable pressure indicator or gauge 52 which is connected to the opening 36 in the body 32 and thus is adapted to measure the firing pressure in the cylinder 20 when desired.

However, as previously mentioned, the measurement of the cylinder firing pressure is not a continuous measurement but is only made periodically. However, the vertical passageway 42 in the cylinder head, and the opening 36 in the body adapter all constitute a certain volume of space which as compared to the combustion chamber of cylinder 20 is appreciable and interferes with the optimum operation of the engine 10 and undesirably decreases the compression ratio of the cylinder 20.

Therefore, and referring to FIGURE 2 when an actual pressure reading is not being taken, the pressure gauge 52 may be removed and a sealing stem 40 may be inserted into the body 32 and secured thereto. Thus, the sealing stem 40 is an elongate rod 56 which may be extended into and filling up the opening 36 in the body 32, and preferably extends into the horizontal passageway 44 and is secured in place such as being secured to the body 32 by securing nut 54 to the threads 50 to which the pressure gauge 52 was previously connected. Thus, when the pressure readings are not being measured the sealing stem 40 is threadably secured in place by the nut 54 and the elongate rod 56 extends into and substantially fills the opening 36 and the horizontal passageway 44 thereby reducing the volume of the passageways and openings in communication with the combustion chamber or cylinder 20 thereby avoiding the disadvantages of having the extra volume chambers connected to the combustion chamber during normal operation.

Preferably a valve seat is provided in one of the openings such as the passageway 44 by providing a valve seat 62 and the stem 40 includes a coacting tapered valve surface 64 for sealing off the passageway 44 and the body opening 36 from the cylinder 20.

In order to properly seal the cylinder firing pressure apparatus O-ring 56 is placed around the adapter body 32 adjacent the engine head 34. A sealing nut 58 is suitably connected around and to the exterior of the adapter body 32 and includes a beveled end 60 for securely wedging the O-ring 56 against the engine head 34 and sealing about the exterior of the body 32.

When it is desired to take a cylinder firing pressure measurement the nut 54 is unscrewed from the threads 50 and the sealing stem 40 including the rod 56 is removed, and as that seen in FIGURE 3 the pressure gauge 52 is threadably attached to the adapter body 32 by connection to the threads 50 so that the usual pressure measurement may be taken.

The present invention, therefore, is well adapted to carry out the objects and attain the ends and advantages mentioned as well as others inherent therein. While a presently preferred embodiment of the invention is given for the purpose of disclosure, numerous changes in the details of construction, and arrangement of parts, may be made which will readily suggest themselves to those skilled in the art and which are encompassed within the spirit of the invention and the scope of the appended claims.

What is claimed is:

1. In combination with a diesel engine having a cylinder and head, the improvement of a cylinder firing pressure apparatus comprising, a passageway in the cylinder head in communication with the cylinder and extending through said head, an elongate tubular adapter body secured in said passageway and including an opening therethrough in communication with said passageway and cylinder, said body including pressure gauge releasable connecting means for receiving a pressure gauge for making firing pressure tests, a stem adapted to extend through and substantially filling said opening for reducing the volume of the opening in communication with the cylinder when testing is completed and adapted to be removed from said opening when making pressure tests, and releasable connecting means between the stem and said body for releasably connecting the stem in said body opening.

2. In combination with a diesel engine having a cylinder and engine head, the improvement of a cylinder firing pressure apparatus comprising, a horizontally directed passageway in the cylinder head in communication with the cylinder and extending through one side of said head, an elongate tubular adapter body the first end of which is secured in said passageway and including an opening in communication with said passageway and cylinder, said body including connecting means at the second end exteriorly of said head adapted to receive a pressure gauge for making firing pressure tests, and a stem adapted to be connected to said body when testing is completed, said stem extending through said opening and into said passageway for reducing the volume of the opening and passageway in communication with the cylinder.

3. The apparatus of claim 2 including, an O-ring encircling said adapter body, and a sealing nut threadably engaging said body and sealing said O-ring against the engine head.

4. In combination with a diesel engine, having a cylinder and engine head, the combination of a cylinder firing pressure apparatus comprising, a vertical passageway in said engine head in communication with the cylinder, a horizontal passageway in the cylinder head connected to the vertical passageway and extending through one side of the head, an elongate tubular adapter body the first end of which is threadably secured in said horizontal passageway, said body having an opening in communication with the passageways and the cylinder and having thread means at the second end adapted to receive a pressure gauge when making firing pressure tests, and a stem adapted to be connected to said body when testing is completed, said stem extending through said opening and into said horizontal passageway for reducing the volume of the opening and the horizontal passageway in communication with the cylinder, a seal encircling said body exteriorly of the engine head, and a lock nut threadedly connected to the exterior of the body for sealing the seal against the engine head.

5. The apparatus of claim 4 including, a valve seat adjacent the cylinder in one of said passageways and opening, a valve element on one end of the stem adapted to engage on said seat when the stem is secured to said body.

References Cited

UNITED STATES PATENTS

| | | | | |
|---|---|---|---|---|
| 1,787,326 | 12/1930 | Sanders | 123—191 | X |
| 1,956,403 | 4/1934 | Scott | 73—115 | X |
| 2,006,712 | 7/1935 | Forbes et al. | 73—420 | X |
| 2,618,978 | 11/1952 | Ragland | 73—420 | |
| 3,320,801 | 5/1967 | Rhindress | 73—116 | |

RICHARD C. QUEISSER, *Primary Examiner.*

JAMES J. GILL, *Examiner.*

J. MYRACLE, *Assistant Examiner.*